United States Patent Office 2,906,703
Patented Sept. 29, 1959

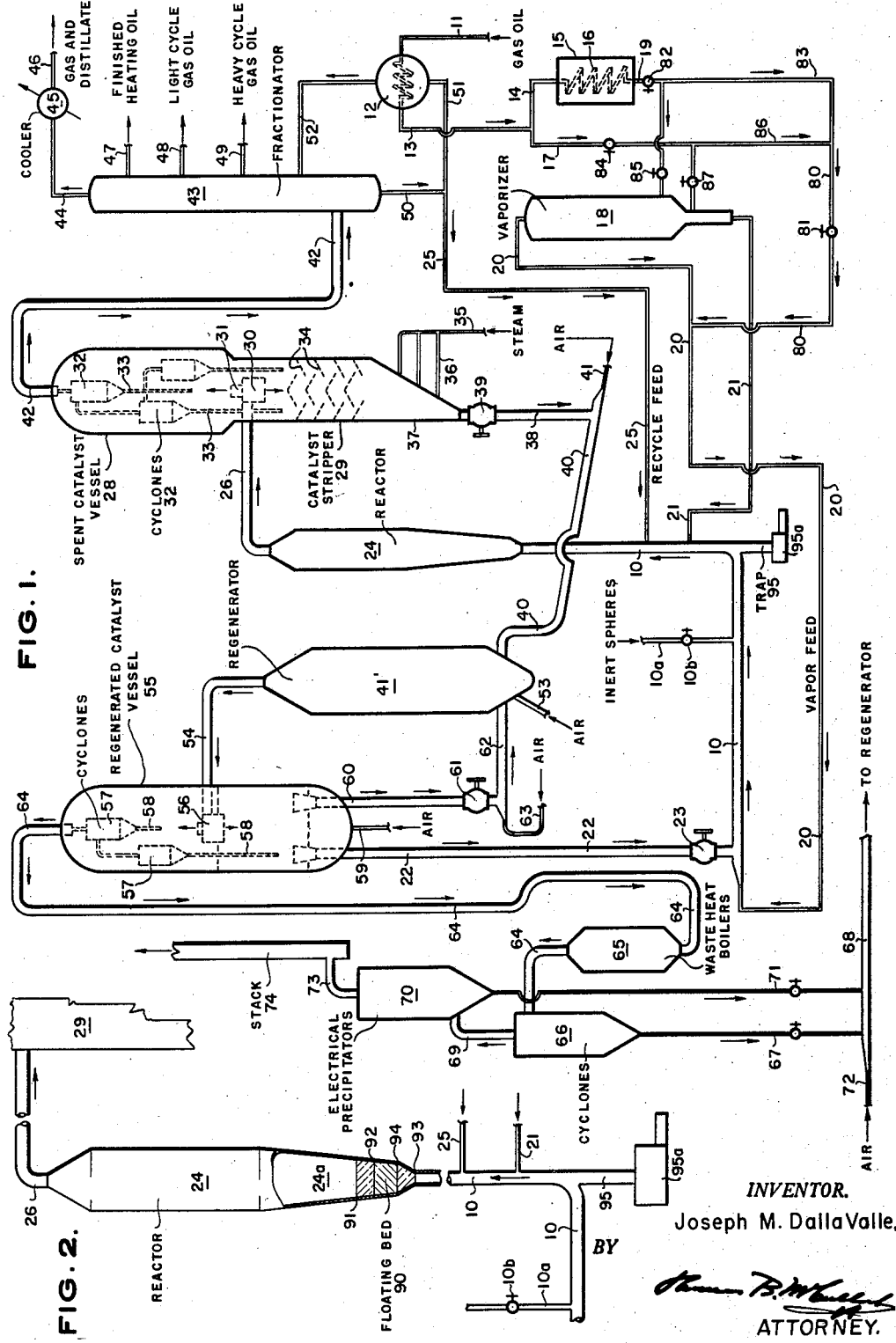

2,906,703

CRACKING WITH INERT AND CATALYTIC SOLIDS

Joseph M. Dalla Valle, Atlanta, Ga., assignor, by mesne assignments, to Esso Research and Engineering Company, Elizabeth, N.J., a corporation of Delaware Application January 28, 1957, Serial No. 636,710

3 Claims. (Cl. 208—149)

The present invention is directed to an improved method for cracking hydrocarbons. More particularly, the invention is directed to cracking hydrocarbons in a suspension of finely divided catalyst in said vaporized hydrocarbons. In its more particular aspects, the invention is directed to cracking of hydrocarbons under contacting conditions with a finely divided catalyst which gives substantially improved and unexpected results.

The present invention may be briefly described as involving a method of cracking hydrocarbons in which a finely divided cracking catalyst is formed into a suspension in admixture with a vaporized hydrocarbon. The suspension is then flowed at a gas velocity in the range between about 8 and 50 feet per second through an elongated reaction zone having a length to diameter ratio in the range from about 4:1 to about 20:1. A sufficient amount of catalyst is maintained in suspension to provide a weight ratio of feed per hour to catalyst in the reaction zone in the range from about 20:1 to about 300:1. The particular feature of the present invention is forming and maintaining a floating bed of solids in the elongated reaction zone, particularly in the lower end thereof and in a tapered section of the elongated reaction zone. The suspension is then flowed through the bed and through the reaction zone, thereby reducing contact time between the catalyst and the vaporized hydrocarbon and lowering the carbon yield. Under these conditions, the hydrocarbons are cracked to desirable products with formation of a minimum amount of carbonaceous material and carbon laid down on the catalyst. It is contemplated that the desirable products will be separated from the catalyst and the catalyst regenerated in a burning or combustion operation and the regenerated catalyst then employed again to form the suspension in admixture with the vaporized hydrocarbon.

The cracking reaction may take place at a temperature in the range from about 800° to about 1100° F.; a preferred range is from about 900° to about 1000° F. with quite desirable results being obtained at about 930° F.

Pressures employed in the improved cracking operation may range from about atmospheric pressure to about 50 p.s.i.g. (pounds per square inch gauge) with a preferred range of pressures from about 20 to about 35 p.s.i.g.

The improved results of the present invention are obtained by flowing the suspension through the reaction zone at a superficial gas velocity in the range between about 8 and about 50 feet per second. It is undesirable to flow the suspension at a superficial gas velocity less than about 8 feet per second and the preferred range is from 8 feet per second to about 20 feet per second. Desirable results may be obtained in the range from about 10 to about 15 feet per second. Vapor or gas velocities in the tapered section may suitably range from about 10 to about 30 feet per second.

The reaction zone employed in the present invention is an elongated reaction zone having a length to diameter ratio in the range from about 4:1 to about 20:1. Desirable results are obtained in a vertical elongated reaction zone having a length to diameter ratio of about 7:1. The reaction zone is preferably a vertical elongated reaction zone.

Also to obtain the beneficial results of the present invention, it is necessary to maintain in the reaction zone an amount of catalyst sufficient to provide a weight ratio of hydrocarbon per hour to catalyst in the reaction zone in the range from about 20:1 to about 300:1. Very good results may be obtained with a weight ratio of feed per hour to catalyst in the reaction zone in the range from about 70:1 to about 250:1.

Too, desirable results may be obtained by maintaining the catalyst rate in the operation depending on the velocity in the range of 8 to 50 feet per second in a maximum amount of 1 ton per second for the minimum velocity and a maximum amount of about 12 tons per second for the maximum velocity. At a velocity of about 20 feet per second the catalyst rate would be maintained up to about 4.5 tons per second. Thus, the catalyst loading in the reaction zone may be expressed by pounds per square foot. This may be expressed as catalyst loading in the reaction zone, and should not exceed 36 pounds per second per square foot for a gas velocity in feet per second of 8, and should not exceed 180 pounds per second per square foot for a gas velocity in feet per second of 20 or about 540 pounds per second per square foot at a gas velocity in feet per second of about 50. Employing these conditions, it is possible to obtain the beneficial results of the present invention.

The conditions employed in the reaction zone of the present invention provide a disperse phase wherein the catalyst in a finely divided condition is suspended in the hydrocarbon. The disperse phase suitably may have a catalyst density in the range from about 3 to about 15 pounds per cubic feet of suspension. It is to be understood that disperse phase is used in the sense as opposed to dense phase where the density of the suspension is in the range from about 20 to about 30 pounds per cubic feet.

The feed stock employed in the present invention is preferably a gas-oil hydrocarbon such as one obtained from crude petroleum. However, other gas-oil fractions may be used. For example, the heavy oil produced in the cracking operation or unconverted portions of the feed stock may form a component of the reaction feed. It is also contemplated that gas-oils produced from thermal cracking operations may suitably be charged to the process of the present invention. It is contemplated that residual crude petroleum fractions may be charged as the feed stocks to the process of the present invention. The present invention may utilize as feed hydrocarbon the cracking stocks now used in either thermal or catalytic cracking of hydrocarbons and thus may encompass a wide range of feed stocks. Under some conditions, it may be desired to crack lighter fractions such as those in the heavy naphtha and kerosene boiling range, say, from about 400° to about 750° F. Solvent extracts containing large percentages of aromatic hydrocarbons may also form the feed stock to the present invention. Crude residues remaining after removal of valuable lubricating oil and other fractions may be charged to the process of the present invention.

The present invention will be further illustrated by reference to the drawing in which:

Fig. 1 is a flow diagram of a preferred mode of practicing the invention; and

Fig. 2 is a partial sectional view of Fig. 1 showing the floating bed.

Referring now to the drawing, numeral 11 designates a charge line through which a gas-oil fraction is introduced into the system from a source not shown. This gas-oil fraction passes through heat exchanger 12 wherein it picks up heat by heat exchange and is heated to a temperature of about 450° F. The heated gas-oil then is discharged from heat exchanger 12 by way of line 13 and may be split into two streams, one stream flowing by way of line 14 into a furnace 15 containing a coil 16 wherein the temperature of the gas-oil is raised to a temperature of about 840° F. The other stream is flowed by way of line 17 into the lower portion of a vaporizer drum 18. The preheated stream from furnace 15 flows by line 19 also into vaporizer 18 at a point in the lower section of vaporizer 18 but above the point where the stream from line 17 is introduced.

The relative amounts of streams introduced by lines 17 and 19 are in the approximate ratio of about 1:6.

In vaporizer 18, conditions may approximate a temperature of 825° F. and a pressure of about 40 p.s.i.g. Under these conditions, there is removed from the top of vaporizer 18 by way of line 20 a vaporous fraction, and there is removed from the bottom of vaporizer 18 by line 21 a liquid fraction.

The vaporous fraction in line 20 is routed thereby into a conduit 10 where it is admixed with a finely divided cracking catalyst which is introduced from conduit 22, controlled by a valve 23. In conduit 10, the finely divided catalyst is formed in a suspension in the vaporous stream introduced by line 20, and the suspension is then flowed into the lower end of a vertical elongated reaction zone 24. At the entrance to the vertical elongated reaction zone 24, the suspension has added to it the liquid stream from line 21, and downstream from the point of addition of the liquid stream there is added to the suspension a liquid hydrocarbon feed introduced by line 25 from a later stage in the process, which will be described in more detail hereinafter.

If desired and as influenced by the volatility or other characteristics of the feed stock, the feed stock may be by-passed around the vaporizer 18 through line 80 controlled by valve 81. When operating in this manner, the feed may be routed through furnace 15 by line 14 and branch line 83, valve 82 being opened and valve 84 in line 17 and valves 85 and 87 being closed. Alternatively, the feed stock may be routed through line 17 and branch line 86, which connects into line 80 by opening valves 84 and closing valves 82 and 85, valve 87 remaining closed. When passing a liquid feed stock through line 20 the heat for vaporization of the feed stock is provided by the hot catalyst when the two are admixed in line 10.

The suspension then carrying the liquid stream introduced by line 10 and the liquid hydrocarbon feed introduced by line 25 flows upwardly through reaction zone 24. Of course, it is understood that the liquid hydrocarbon streams introduced by lines 21 and 25 under the conditions prevailing in the reaction zone 24 also become vaporized. Operations may be conducted in reaction zone 24 to maintain a temperature of about 930° F., a pressure of 30 p.s.i.g., and the suspension may contain about 10 tons of catalyst.

After passage through the elongated reaction zone 24, the several hydrocarbon streams introduced therein have been substantially cracked to desirable products which are contained in the suspension. This suspension containing the desirable products flows by way of a conduit 26 into a catalyst vessel 27 which is provided with an upper section 28, which may be termed a spent catalyst section, and a lower section 29, which may be termed a catalyst stripper section.

The suspension containing desirable products is introduced into the vessel 27 through a distributor box 30 which is provided with a riser 31 which allows the catalyst and vaporized products to discharge upwardly into section 27 and also allows the products and suspension to be discharged downwardly into section 29. The upper section 28 is provided with at least a separating means which may be a plurality of cyclones 32, which are well known to the art. These cyclones 32 may be interconnected to allow the gases and desirable products to flow from the lower of the cyclones sequentially through the cyclones to insure maximum separation of the products from the catalyst. The cyclones are provided with dip legs 33 which discharge the catalyst downwardly in the vessel 27 and specifically into the sections 28 and 29. The catalyst separated from the desirable products flows downwardly in stripper 29, which is provided with a plurality of baffle plates 34 which insures contact of the catalyst with stripping steam or a stripping gas which is introduced into the section 29 by line 35 through manifold 36. The steam flowing countercurrently to the descending catalyst removes volatilizable carbonaceous material from the catalyst which flows downwardly in the catalyst stripper section 29 and outwardly therefrom through the cone-shaped section 37 into a conduit 38 controlled by a valve 39. The conduit 38 connects into a transverse conduit 40 which is provided with line 41, through which air is introduced into conduit 40. The air picks up the stripped catalyst and discharges it by way of conduit 40 into a regenerator vessel 41' where a regeneration operation takes place which will be described in more detail hereinafter.

The products from the cracking reaction substantially separated from catalyst are withdrawn from vessel 27 by way of conduit 42, which introduces the desirable products into the lower section of a fractionation zone 43, wherein the desirable products are separated and recovered. The fractionation zone may comprise a plurality of distillation towers which may be shown for convenience as a single distillation tower.

Fractionation zone 43 may operate at a top temperature of about 275° F. and a bottom temperature of about 700° F. A pressure of about 22 p.s.i.g. may be maintained on the fractionation zone 43.

Under these conditions, there may be removed from zone 43 by line 44 a fraction containing gaseous materials and the lighter fractions such as the desirable vaporous hydrocarbons having three or more carbon atoms in the molecule. For example, the stream withdrawn by line 44 may contain propane, propylene, butanes, and butylenes and the higher boiling hydrocarbons. This stream also contains the desirable cracked gasoline which may be suitably recovered. The stream in line 44 is passed through a condenser and cooler 45 and then discharged by line 46 to stabilization and recovery facilities not shown. A heating oil fraction may be withdrawn from fractionation zone 43 by line 47, and light and heavy cycle gas-oil fractions may be withdrawn from zone 43 by lines 48 and 49, respectively. A heavier fraction is withdrawn from zone 43 by line 50 which connects into line 25 and forms a source for the feed hydrocarbon introduced by line 25 into zone 24. During the cracking operation in zone 24 there is laid down on the catalyst volatilizable carbonaceous material and coke. This material, if allowed to remain on the catalyst, would impair the cracking operation; however, it is desirable to have a small amount of coke or carbonaceous material on the catalyst since this allows the heat necessary for the process to be obtained at least in part by burning this material from the catalyst. It is necessary to remove this material from the catalyst to regenerate same and to allow reuse of the catalyst in the cracking operation. To this end, the air introduced into line 40 by line 41 is supplemented by air introduced into reaction zone 41' by line 53 connecting to a compressor or some other source of air. By controlling the oxygen content of the air or other free oxygen containing gas introduced into regeneration zone 41', it is possible to conduct a combustion or burning operation in regeneration zone 41' such that catalyst is substantially freed of unstrippable carbonaceous material and coke and then may be reused in the process. For example, the regenerator 41' may contain about 100 tons of catalyst which is contacted with about 47,000 standard cubic feet of air per minute causing combustion of the combustible material on the catalyst. The other conditions for maintenance for the combustion operation may be a temperature of about 1100° F. and a pressure of 11 p.s.i.g.

The regenerated catalyst in a suspension of the combustion products then flows from regeneration zone 41' by way of line 54 into a regenerated catalyst vessel 55 through a distribution box 56.

The regenerated catalyst vessel 55 is provided with separation means illustrated by cyclones 57 which may be arranged for sequential flow of the suspension therethrough to obtain maximum separation of catalyst from the combustion products, which may be termed flue gas. The cyclones 57 are provided with dip ligs 58 which discharge the separated catalyst back into the vessel 55. This vessel may contain catalyst at a temperature of about 1125° F. and is of a suitable size to provide storage for about 50 tons of regenerated catalyst. Air may be introduced into the vessel 55 by line 59.

Conduit 22 withdraws the catalyst from the vessel 55 for introduction into conduit 21, as has been described, while conduit 60 controlled by valve 61 provides recycle of catalyst from vessel 55 into regenerator 41'. Conduit 60 connects into a conduit 62, into which is introduced by line 63 a sufficient amount of air to carry the catalyst from conduit 60 through conduit 62 into vessel 41'. The amount of air introduced by line 63 supplements the air introduced by lines 41 and 53.

The combustion products or flue gas from which catalyst has been separated by cyclones 57 in vessel 55 is withdrawn from vessel 55 by conduit 64, which is provided with a waste heat boiler 65 which may be a bank of tubes surrounding or arranged in the conduit 64. The waste heat boiler 65 recovers some of the heat contained in the flue gas which may be at a temperature of 1,000° F. The flue gas then flows into cyclones 66 which serve to remove catalyst fines not removed by cyclones 57 from the combustion products. These catalyst fines may have particle diameters in the range from about 0 to 20 microns. The separated catalyst fines are discharged from cyclones 66 by way of line 67 into a line 68, and the disposition of these fines will be described further hereinafter.

The flue gas substantially free of catalyst fines but containing a small amount thereof is then routed by conduit 69 into electrical precipitators 70, which may be of a conventional type where the residual amount of fines is substantially removed from the flue gas. These fines are discharged by line 71 into line 68. Air may be introduced into line 68 by line 72 in an amount sufficient to transport the fines to regenerator 41'.

A flue gas substantially free of fines is then discharged into the atmosphere by way of a conduit 73 which connects into a stack 74. It is not practical to separate completely all of the fines from the flue gas, and a minimum amount of catalyst fines may be discharged through stack 74. In fact, it may be desirable to discharge a minimum amount of catalyst fines, since discharge of a small amount and replacement thereof with fresh catalyst serves to maintain the activity of the catalyst at a high level.

Referring now particularly to Figs. 1 and 2, solids are introduced into the system by way of line 10a controlled by valve 10b, line 10a connecting into line 10 which discharges catalysts by way of conduit 22 controlled by a valve 23 from the regenerated catalyst vessel 55. The solids, which may be catalytically active or inactive, are preferably in the form of spheres having a diameter greater than the diameter of the catalyst. Suitably, the diameter of the spheres may be in the range from about 1 to about 4 centimeters. The velocity of the suspension in line 10 carries the solids plus the catalyst for admixture with the recycle feed introduced by line 25 and the vaporous feed introduced by line 21, as has been described.

By virtue of the specific gravity and the size of the solids introduced by line 10a, a floating bed 90 of the solids is maintained in the tapered section 24a of the reactor 24. The floating bed 90 is ordinarily substantially static by virtue of the size and specific gravity of the solids particles and by virtue of the velocity through the conduit 10 and the tapered section 24a but the floating bed may have a level which will vary from a level indicated by the numeral 91 and the level indicated by the numeral 92 and designated by the upper shaded portion. Likewise, the lower level may vary from a low point indicated by the numeral 93 and a high point as indicated by the numeral 94 and designated by the shaded portion.

By virtue of an operation as described in connection with the drawing, it is possible to achieve substantially improved and unexpected results in cracking hydrocarbons. Thus, with the present invention, it is possible to conduct a cracking operation at high efficiencies with the laying down of less coke on the catalyst than is possible in conventional operations. It is possible to produce substantially appreciated amounts of gasoline hydrocarbons without impairment of the amount of desirable butanes and butylenes.

The present invention also effectively reduces contact time in the lower or tapered section 24a of the reaction zone 24 where the velocity is decreasing by virtue of the increasing size of the reactor 24 and forms an effective diluent where the solid particles are catalytically inert and serve to control conversion and the carbon yield. Distribution of the catalysts uniformly in the catalyst zone 24 is effected and the presence of the solids tends to reduce slugging and backmixing on passing of the suspension to the reaction zone 24 and its attendant conduits.

The present invention is particularly applicable to a reaction zone 24 which may have an overall length of about 55 feet and an internal diameter at its greatest width of about 8 feet. The vertical walled portion of reaction zone 24 may itself be about 35 feet in length wherein the tapered section 24a has a length of about 20 feet, the tapered section decreasing in diameter from 8 feet to about 3 feet where it joins the conduit 10.

From time to time it may be desirable to replace at least part of the solids introduced by line 10a and to this end a trap such as 95 provided with a suitable slide valve or conveyor 95a allows the discharge of the solids from the conduit 10. By suitably reducing the velocity of flow through line 10, the solids, by virtue of their larger size and greater specific gravity of the catalyst particles, will drop out into trap 95 and will be removed by removing means 95a which, as stated, may be a slide valve or screw conveyor 95a.

The floating bed of solids 90 may suitably have a thickness from about 1 to about 6 inches and, in a commercial transfer line reactor such as 24, may contain from about 100 to about 500 pounds of the solids. A thickness of about 2½ to about 3 inches is preferable and will provide a pressure drop of about 2 pounds per square inch to cause a decrease in contact time and an increase in catalyst flow through the tapered section 24a.

For example, the solids employed to make up the bed 90 may have particle diameters (centimeters) such as shown in Table I.

*Table I*

| Distance above bottom of tapered section, ft. | Vapor rate (cu. ft./sec.) | | | | |
|---|---|---|---|---|---|
| | 450 | 500 | 550 | 600 | 650 |
| 3 | 2.03 | 2.30 | 2.84 | 3.30 | 3.80 |
| 4 | 1.52 | 1.81 | 2.10 | 2.48 | 2.81 |
| 5 | 1.20 | 1.43 | 1.67 | 1.92 | 2.18 |
| 6 | 0.94 | 1.09 | 1.26 | 1.43 | 1.68 |

The distance above the bottom of the tapered section is measured from the level 93 shown in Fig. 2. Furthermore, the particle diameters are suitably based on a catalyst velocity of about 3.5 feet per second with a solids having a specific gravity of about 4 and providing about 250 pounds of solids per cubic foot of bed 90 at a temperature of 940° F. and a vapor density of about 0.39 pound per cubic foot.

From the foregoing Table I, it may be seen that the particle diameters may range from about 1 to about 4 centimeters. Suitable materials for use as the solids, preferably in the form of spheres, which may be catalytically active or inactive may be selected from a large number of materials. As examples of these materials, by way of illustration and not by way of limitation, may be mentioned Alundum; Carborundum; Benitoite, which is a barium titanium silica compound; Celestite, which is strontium sulfate; Chalcopirite, sometimes known as copper pyrites; Corundum, hematite, Ilmenite, Lepidocrocite, Powellite, Pyrolusite, Rhodonite, and the like. The solids making up the floating bed 90 suitably should have a specific gravity in the range from about 3 to about 5.

The catalyst employed in the practice of the present invention may be a silica-alumina catalyst having particle diameters in the range from about 0 to about 100 microns with a major amount of the catalyst having particle diameters in the range from about 20 to about 80 microns.

While it is preferred to use silica-alumina catalyst, the invention may be practiced with silica-magnesia catalyst, silica-zirconia catalyst and many other finely divided cracking catalysts known to the art.

The catalyst particles suitably may have a specific gravity in the range of about 1.6 to about 2.73 with a preferred specific gravity in the range from about 1.92 to about 2.40.

The nature and objects of the present invention having been completely described and illustrated, what I wish to claim as new and useful and secure by Letters Patent is:

1. The method of cracking vaporized hydrocarbons which comprises forming a suspension of a finely divided cracking catalyst in said vaporized hydrocarbons, forming and maintaining a substantially static floating bed of catalytically inert solids of a larger diameter and of greater specific gravity than that of the catalyst in the lower end of a vertical elongated reaction zone having a length to diameter ratio in the range from about 4:1 to about 20:1 and maintained under cracking conditions including a temperature in the range from about 800° to about 1100° F. and a pressure in the range from about atmospheric to about 50 pounds per square inch gauge, said floating bed having a thickness in the range from about 1 to about 6 inches sufficient to reduce the pressure about 2 pounds per square inch gauge, and then passing said suspension through said bed and through said reaction zone as a disperse phase at a superficial gas velocity in the range between about 8 and about 50 feet per second and thereby reducing contact time between said catalyst and vaporized hydrocarbon and lowering carbon yield, the specific gravity of the catalyst being in the range between about 1.6 and 2.73 and the specific gravity of the inert solids being in the range between about 3.0 and about 5.0, said solids having particle diameters from about 1.0 to about 4.0 cm. and said catalyst having particle diameters in the range from about 0 to about 100 microns.

2. A method in accordance with claim 1 in which the catalytically inert solids are spheres.

3. A method in accordance with claim 1 in which the vertical elongated reaction zone has an overall length of about 55 feet and a diameter of about 8 feet, about the lower 20 feet of said elongated reaction zone forming a tapered zone with the floating bed being from about 1 to about 6 feet from the bottom of the tapered zone.

References Cited in the file of this patent
UNITED STATES PATENTS

| | | |
|---|---|---|
| 2,455,915 | Borcherding | Dec. 14, 1948 |
| 2,742,403 | Nicholson et al. | Apr. 17, 1956 |
| 2,760,917 | Ward | Aug. 28, 1956 |
| 2,763,597 | Martin et al. | Sept. 18, 1956 |